United States Patent
Scott

(10) Patent No.: US 6,436,286 B1
(45) Date of Patent: Aug. 20, 2002

(54) PAINT STRAINER FOR USE WITH PAINT SPRAYERS

(76) Inventor: William J. Scott, 743 E. Bell Rd. Suite 2, #136, Phoenix, AZ (US) 85022

( * ) Notice: Subject to any disclaimer, the term of this patent is extended or adjusted under 35 U.S.C. 154(b) by 0 days.

(21) Appl. No.: 09/506,307

(22) Filed: Feb. 17, 2000

(51) Int. Cl.⁷ .............................................. B01D 29/13
(52) U.S. Cl. ...................... 210/232; 210/448; 210/469; 210/474
(58) Field of Search ................................ 210/232, 448, 210/473, 474–477, 479, 482, 455, 497.01, 464, 469, 453; 206/223

(56) References Cited

U.S. PATENT DOCUMENTS

| | | |
|---|---|---|
| 965,611 A | 7/1910 | Tucker |
| 1,767,269 A | 6/1930 | Westerberg |
| 2,192,438 A | 3/1940 | Gulick |
| 2,436,924 A | 3/1948 | Hansen |
| 2,521,094 A | 9/1950 | Rein |
| 2,844,256 A | 7/1958 | Campbell |
| 2,883,057 A | 4/1959 | Richards |
| 4,025,435 A | 5/1977 | Shea |
| D255,480 S | 6/1980 | Zieg |
| 4,804,470 A | 2/1989 | Calvillo et al. |
| 4,816,148 A | 3/1989 | Hemman |
| 4,946,591 A | 8/1990 | Mealey |
| 5,059,319 A | 10/1991 | Welsh |
| 5,186,828 A | 2/1993 | Mankin |
| 5,248,089 A * | 9/1993 | Bekius |
| 5,368,728 A | 11/1994 | Reaves |
| 5,914,036 A * | 6/1999 | Sullivan ...................... 210/474 |
| 6,247,600 B1 * | 6/2001 | Sullivan ...................... 210/474 |

FOREIGN PATENT DOCUMENTS

GB 452393 8/1936

* cited by examiner

Primary Examiner—Joseph W. Drodge
(74) Attorney, Agent, or Firm—Frank J. McGue

(57) ABSTRACT

A paint strainer is disclosed for use with a paint container and a pickup tube. The paint strainer comprises a mesh bag having an elastic material surrounding the opening of the bag wherein the elastic material engages the rim of the container to hold the bag in place. The bag further includes an aperture formed adjacent to the rim of the container which receives the pickup tube surrounded by an elastic band.

2 Claims, 1 Drawing Sheet

PAINT STRAINER FOR USE WITH PAINT SPRAYERS

BACKGROUND OF THE INVENTION

This invention relates to paint strainers, and more particularly, to the field of paint strainers used in connection with paint sprayers.

Presently, painters are straining paint by pouring paint from one container through a mesh into a second container. This requires a time consuming cleaning of the mesh before using the paint in a sprayer.

Spray guns used in the paint industry are susceptible to clogging due to the small apertures used in the spraying apparatus to create a fine spray. Large particles such as dirt, undispersed pigment, undissolved resin and the like can clog the spray nozzles. Thus, it is important to filter the paint immediately prior to use.

DESCRIPTION OF THE PRIOR ART

Heretofore a number of patents have been directed to paint strainers for spray gun apparatus.

U. S. Pat. No. 2,251,094 discloses a strainer which clamps over the lower end of a pickup tube for a paint sprayer.

U. S. Pat. No. 5,186,828 discloses a strainer having a slot in a retaining member to accommodate a pickup tube for a paint sprayer. See also U. S. Pat. Nos. 4,816,148 and 4,946,591 for similar arrangements.

U. S. Pat. No. 4,804,470 discloses a plastic paint strainer which is held in place by a suitable adhesive or other attachment means.

British Patent No. 452,393 discloses a filter bag for a milking pail which is held in place around the rim of the container by using elastic to engage the rim.

None of the known prior art disclose the device set forth and claimed herein.

SUMMARY OF THE INVENTION

In accordance with the invention claimed, a new and improved economical, convenient and readily useable paint sprayer is provided which may comprise a throwaway item if cleaning time becomes a cost issue.

It is, therefore, one object of this invention to provide a novel paint strainer for use in combination with paint containers.

Another object of this invention to provide a paint strainer which receives a pick-up tube of a paint sprayer.

A further object of this invention is to provide a new and improved paint strainer for continuous combination with the wand of a paint sprayer.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
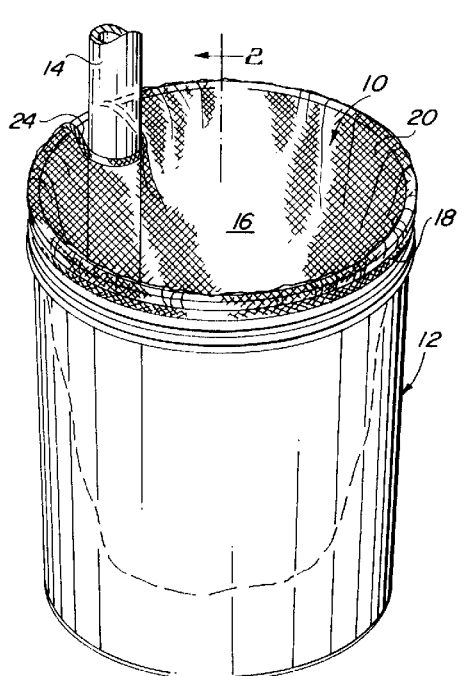
FIG. 1 is a perspective view of the present invention.
Figure 4:
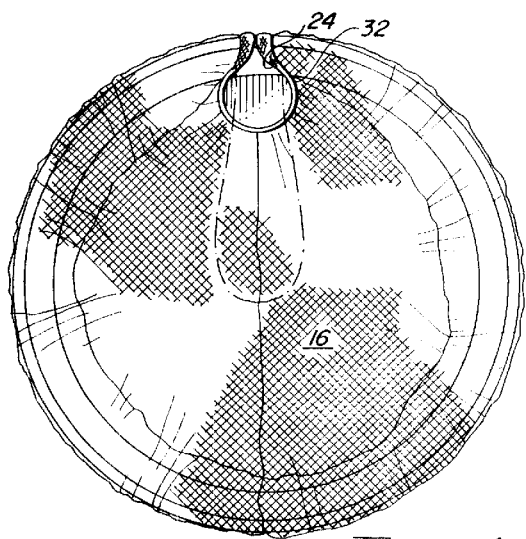
FIG. 4 is a top view of the present invention.
Figure 5:
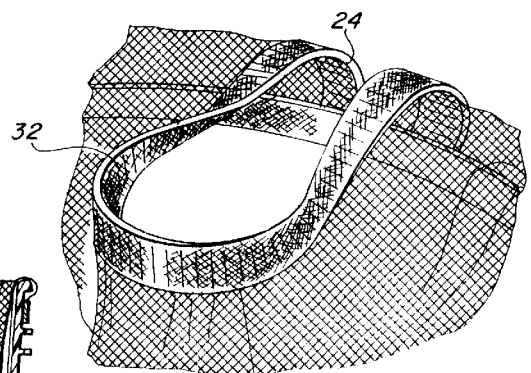
FIG. 5 is a close up view of an aperture of the present invention.
Figure 2:
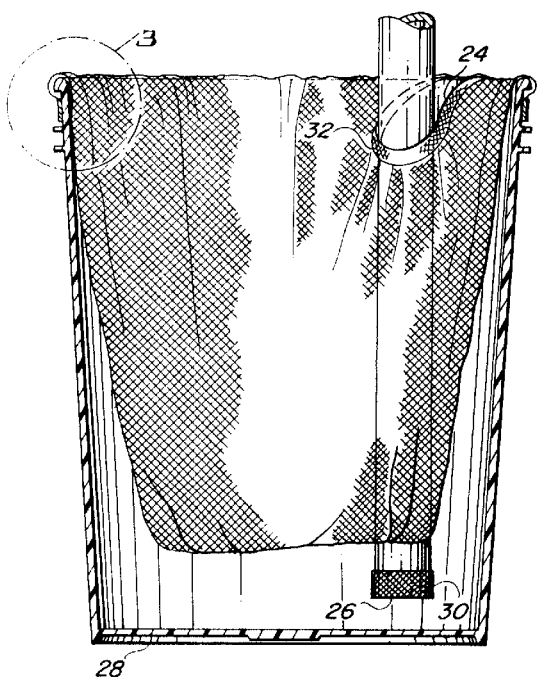
FIG. 2 is a cross sectional view of FIG. 1 taken along line 2—2.
Figure 3:
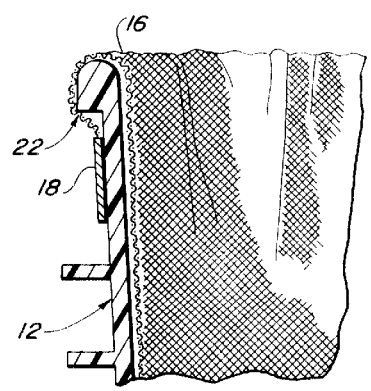
FIG. 3 is an expanded view of FIG. 2 taken in the circled area 3.

Referring more particularly to the drawings by characters of reference, FIGS. 1–5 disclose a paint strainer 10 for use with a paint container 12 and a pickup tube 14 of a paint sprayer. Paint container 12 can be any size, from one gallon to fifty five gallons. The paint strainer 10 comprises a mesh bag 16 having an elastic material 18 surrounding an opening 20 of bag 16. The unstretched opening 20 is about ⅔ the size of a rim 22 of container 12. However, as best seen in FIG. 5, elastic 18 and opening 20 stretch over and engage rim 22 of container 12 thus holding bag 16 in place. Further, bag 16 includes an aperture 24 formed adjacent to rim 22 of container 12 for receiving pickup tube 14 of the paint sprayer.

In use, bag 16 is placed into paint container 12. Elastic 18 engages rim 22 of container 12 to hold bag 16 in position. Pickup tube 14 of the paint sprayer is inserted into aperture 24 whereby an open end 26 of tube 14 is proximate to a bottom 28 of paint container 12. Preferably, bag 16 is tapered whereby its sides are about two inches from the sides of the container at the bottom of bag 16.

Paint can then be poured into container 12 through bag 16, thus being filtered. The mesh size of bag 16 of course controls the size of particles allowed therethrough. Pickup tube 14 takes up paint from bottom 28 of the container 12 and thus supplies only filtered paint to the sprayer. A mesh cap 30 can optionally be positioned over open end 26 of tube 14 to provide additional filtration if desired.

The dimensions of aperture 24 are large enough to receive pickup tube 14 but small enough to prevent unfiltered paint from bypassing bag 16 by overflowing aperture 24. Alternatively, aperture 24 can include an elastic band 32 which stretches to receive pickup tube 14. Elastic band 32 of aperture 24 will minimize the opening to the actual size of pickup tube 14 thus minimizing the possibility of unfiltered paint entering paint container 12. Preferably, elastic band 32 can stretch such that aperture 24 extends to the middle of paint container 12. Elastic band 32 can be made of any suitable material, including, but not limited to, rubber grommets and the like.

Although but one embodiment has been illustrated and described, it will be apparent to those skilled in the art that various changes and modifications may be made therein without departing from the spirit of the invention or from the scope of the appended claims.

That which is claimed is:

1. A paint strainer for use with a paint container having a rim defining an upper opening and a pickup tube, the paint strainer comprising a mesh bag having an upper opening and including an elastic material surrounding the upper opening, the elastic material adapted to engage the rim of the container to hold the bag in place in the container as paint is poured through the bag into the container, the bag having an aperture formed therein adjacent to the rim of the container for receiving the pickup tube and an elastic band surrounding the aperture for holding a received pickup tube.

2. A paint container having a rim defining an upper opening for use with a pickup tube, the paint container having a paint strainer comprising a mesh bag having an upper opening surrounded by an elastic material which engages the rim of the container to hold the bag in place as paint is poured through the bag into the container, the bag further including an aperture formed adjacent to the rim of the container for receiving the pickup tube and an elastic band surrounding the aperture for holding the pickup tube.

* * * * *